US010533089B2

(12) United States Patent
Miyamoto et al.

(10) Patent No.: US 10,533,089 B2
(45) Date of Patent: Jan. 14, 2020

(54) POLYAMIDE RESIN COMPOSITION

(75) Inventors: Akio Miyamoto, Ube (JP); Yasuharu Fukui, Ube (JP)

(73) Assignee: UBE INDUSTRIES, LTD., Ube-Shi, Yamaguchi (JP)

( * ) Notice: Subject to any disclaimer, the term of this patent is extended or adjusted under 35 U.S.C. 154(b) by 0 days.

(21) Appl. No.: 13/583,234

(22) PCT Filed: Mar. 8, 2011

(86) PCT No.: PCT/JP2011/055409
§ 371 (c)(1),
(2), (4) Date: Sep. 7, 2012

(87) PCT Pub. No.: WO2011/111713
PCT Pub. Date: Sep. 15, 2011

(65) Prior Publication Data
US 2013/0072622 A1 Mar. 21, 2013

(30) Foreign Application Priority Data

Mar. 8, 2010 (JP) ................................. 2010-051180
Mar. 8, 2010 (JP) ................................. 2010-051181
Mar. 8, 2010 (JP) ................................. 2010-051182

(51) Int. Cl.
*C08L 77/00* (2006.01)
*C08L 77/06* (2006.01)

(52) U.S. Cl.
CPC ................................. *C08L 77/06* (2013.01)

(58) Field of Classification Search
CPC .......... C08L 77/00; C08L 77/06; C08L 77/02; C08L 25/06; C08L 71/12; C08K 3/40
USPC ........................................................ 524/494
See application file for complete search history.

(56) References Cited

U.S. PATENT DOCUMENTS

| | | | |
|---|---|---|---|
| 5,166,247 A * | 11/1992 | Takatori et al. ............... 524/377 |
| 5,554,677 A | 9/1996 | Nagaoka et al. | |
| 5,569,629 A * | 10/1996 | TenEyck ............... | C03C 13/006 501/35 |
| 5,665,137 A * | 9/1997 | Huang ......................... 65/134.1 |
| 5,703,164 A * | 12/1997 | Nakano .......................... 525/133 |
| 5,804,638 A * | 9/1998 | Hayashi .................... | C08K 3/04 524/494 |
| 5,990,244 A * | 11/1999 | Warakomski et al. ....... 525/179 |
| 2001/0047050 A1* | 11/2001 | Oyamada et al. ............. 524/494 |
| 2002/0048676 A1* | 4/2002 | McDaniel et al. ............ 428/404 |
| 2003/0000055 A1* | 1/2003 | Adzima .................... | D02J 1/08 28/247 |
| 2005/0005890 A1 | 1/2005 | Asfaw et al. | |
| 2005/0232827 A1* | 10/2005 | Merry ........................... 422/179 |
| 2007/0244231 A1* | 10/2007 | Borade .................. | C08L 71/12 524/133 |
| 2008/0090953 A1 | 4/2008 | Elkovitch et al. | |
| 2008/0160286 A1* | 7/2008 | Asrar .................. | B29C 45/0005 428/323 |
| 2009/0069478 A1 | 3/2009 | Seki et al. | |
| 2010/0069220 A1* | 3/2010 | McGinnis ............... | C03B 5/235 501/32 |
| 2010/0098893 A1* | 4/2010 | Okushita et al. ............ 428/36.9 |
| 2010/0249307 A1* | 9/2010 | Stoppelmann .......... | C08L 77/00 524/423 |

FOREIGN PATENT DOCUMENTS

| | | |
|---|---|---|
| EP | 2066750 A1 | 6/2009 |
| JP | 4-198226 A | 7/1992 |
| JP | 6-172603 A | 6/1994 |
| JP | 8-294970 A | 11/1996 |
| JP | 2000-161161 A | 6/2000 |
| JP | 2001-152985 A | 6/2001 |
| JP | 2001-179831 A | 7/2001 |
| JP | 2007-145699 A | 6/2007 |
| JP | 2007-530845 A | 11/2007 |
| JP | 2008-133954 A | 6/2008 |
| JP | 2009-298870 A | 12/2009 |
| JP | 2010-42985 A | 2/2010 |
| JP | 2010-506970 A | 3/2010 |
| WO | WO 2004/092274 A1 | 10/2004 |

(Continued)

OTHER PUBLICATIONS

BASF Corporation, "An Advanced High Modulus (HMG) Short Glass—Fiber Reinforced Nylon 6: Part II—Mechanical Performance", pp. 1-6, (2003). obtained online from: http://www2.basf.us//PLASTICSWEB/displayanyfile?id=0901a5e180004883.*
P. K. Mallick, "Fiber-Reinforced Composites—Materials, Manufacturing, and Desing" Second Edition, Marcel Dkker, Inc. Ney York1993, pp. 11-12.*
International Search Report (PCT/ISA/210) dated Jun. 7, 2011, by the Japanese Patent Office as the International Searching Authority for International Application No. PCT/JP2011/055409.
Written Opinion (PCT/ISA/237) dated Jun. 7, 2011, by the Japanese Patent Office as the International Searching Authority for International Application No. PCT/JP2011/055409.

(Continued)

*Primary Examiner* — Alexander C Kollias
(74) *Attorney, Agent, or Firm* — Buchanan, Ingersoll & Rooney PC

(57) ABSTRACT

A polyamide resin composition comprising a polyamide resin (A), glass (C), and optionally a styrene polymer (B1) and a modified PPE (B2), wherein the total amount of A, B1, and B2 and the amount of C are, respectively, 40 to 95% by weight and 60 to 5% by weight, based on the weight of the composition, wherein the amount of A and the total amount of B1 and B2 are, respectively, 50 to 100% by weight and 50 to 0% by weight, based on 100% by weight of the whole of A, B1, and B2, wherein when C contains glass containing no boron oxide (C1), the amount of C1 is 60 to 5% by weight, based on the weight of the composition, wherein when C does not contain C1, A is a polyoxamide resin, or the amount of A and the total amount of B1 and B2 are defined.

7 Claims, 2 Drawing Sheets

(56) References Cited

FOREIGN PATENT DOCUMENTS

| WO | WO 2005/008056 A2 | | 1/2005 | |
|----|----|----|----|----|
| WO | WO 2008/072754 | * | 6/2008 | ............. C08G 69/26 |
| WO | WO 2009/055948 | * | 5/2009 | ............. C08L 77/00 |
| WO | WO 2009/154063 A1 | | 12/2009 | |

OTHER PUBLICATIONS

Wallenberger et al., Glass Fibers, ASM Handbook 2001, vol. 21; Composites (#06781G), pp. 27-35.
Office Action issued by the Singapore Patent Office in corresponding Singapore Patent Application No. 201206646-0 dated Jul. 4, 2015 (5 pages).
Supplementary Partial European Search Report issued by the European Patent Office in corresponding European Application No. 11753371 dated Jun. 30, 2015 (8 pages).
"ADVANTEX Glass Reinforcements Specifying the Right Reinforcements is Critical for Corrosive Composite Applications," Owens Corning Product Information, Jul. 2009.
Kevin Spoo: "An Inside Look At Corrosion in Composite Laminates Boron-Free E-CR Glass Fibers Demonstrate Superior Corrosion Resistance Compared Structures Exposed to Sulfuric Acid. Previous Research on Leaching Mechanism of E-Glass in Acids is Confirmed Visually," Apr. 2010.
Office Action issued by the Japanese Patent Office in corresponding Japanese Patent Application No. 2016-031803 dated Oct. 18, 2016 (6 pages including partial English translation).
Office Action issued by the Japanese Patent Office in corresponding Japanese Patent Application No. 2016-031803 dated May 16, 2017 (3 pages including partial English translation).

\* cited by examiner

POLYAMIDE RESIN COMPOSITION

FIELD OF THE INVENTION

The present invention relates to a polyamide resin composition which is a thermoplastic resin composition having excellent acid resistance.

BACKGROUND ART

Conventionally, in vehicles, such as automobiles, there may be employed an EGR (exhaust gas recirculation) system in which part of the exhaust gas from an engine mounted on an automobile is recirculated to an intake system and added to a mixed gas in the intake system to lower the combustion temperature of the mixed gas. The employment of this system can reduce the amount of $NO_x$ generated.

Further, the regulation of fuels and the prevention of environmental problems demand the reduction of the weight of materials for the above system, and, for meeting such demands, a polyamide resin composition is widely used as a substitute material for a metal (for example, patent document 1).

These materials are required to be further improved in acid resistance.

As a method for improving the acid resistance, patent document 2 proposes a polyamide resin composition comprising a soft fluororesin and a polyamide resin.

CITED REFERENCES

Patent Documents

Patent document 1: Japanese Patent Application prior-to-examination Publication (kohyo) No. 2007-530845
Patent document 2: Japanese Unexamined Patent Publication No. Hei 6-172603

DISCLOSURE OF THE INVENTION

Problems to be Solved by the Invention

However, the polyamide resin composition disclosed in patent document 1 (for example, paragraph 0046) is not satisfactory from the viewpoint of the improvement of acid resistance, and the polyamide resin composition disclosed in patent document 2 has an effect such that the acid resistance is improved, but has problems to be solved about mechanical strength and rigidity when taking the use of the composition in automobile applications into consideration.

An object of the present invention is to provide a polyamide resin composition which has excellent acid resistance and is lightweight and hence can be advantageously used in applications of a part for exhaust gas passing therethrough by EGR, such as an intake manifold, an EGR delivery pipe, or an EGR cooler part.

Means to Solve the Problems

The present invention has the following contents.
(1) A polyamide resin composition comprising:
a polyamide resin (component A),
glass (component C), and
optionally a styrene polymer (component B1) and a modified polyphenylene ether (component B2), the component B1 having a deflection temperature under load of 140 to 280° C.

the total amount of the components A, B1, and B2 and the amount of the component C being, respectively, 40 to 95% by weight and 60 to 5% by weight, based on 100% by weight of the polyamide resin composition,
the amount of the component A and the total amount of the components B1 and B2 being, respectively, 50 to 100% by weight and 50 to 0% by weight, based on 100% by weight of the whole of the components A, B1, and B2,
wherein when the component C contains glass containing no boron oxide (component C1), the amount of the component C1 is 60 to 5% by weight, based on 100% by weight of the polyamide resin composition,
wherein when the component C does not contain the component C1, the component A is a polyoxamide resin, or the amount of the component A and the total amount of the components B1 and B2 are, respectively, 50 to 90% by weight and 50 to 10% by weight, based on 100% by weight of the whole of the components A, B1, and B2.

(2) A molded article comprising the polyamide resin composition according to item (1) above, which is for use in a part for exhaust gas passing therethrough by an EGR system.

(3) A part for exhaust gas passing therethrough by an EGR system, the part comprising the molded article according to item (2) above, which comprises the polyamide resin composition for use in a part for exhaust gas passing therethrough by an EGR system.

(4) A method for producing a part for exhaust gas passing therethrough by an EGR system, the method comprising shaping the polyamide resin composition according to item (1) above.

(5) A method for producing an automobile, comprising incorporating a part for exhaust gas passing therethrough by an EGR system, which is obtained by the method according to item (4) above.

Effect of the Invention

In the present invention, there can be provided a polyamide resin composition that is a thermoplastic resin which has excellent acid resistance and is lightweight and hence can be advantageously used in applications of a part for exhaust gas passing therethrough by EGR, such as an intake manifold, an EGR delivery pipe, or an EGR cooler part.

BEST MODE FOR CARRYING OUT THE INVENTION

Figure 1:
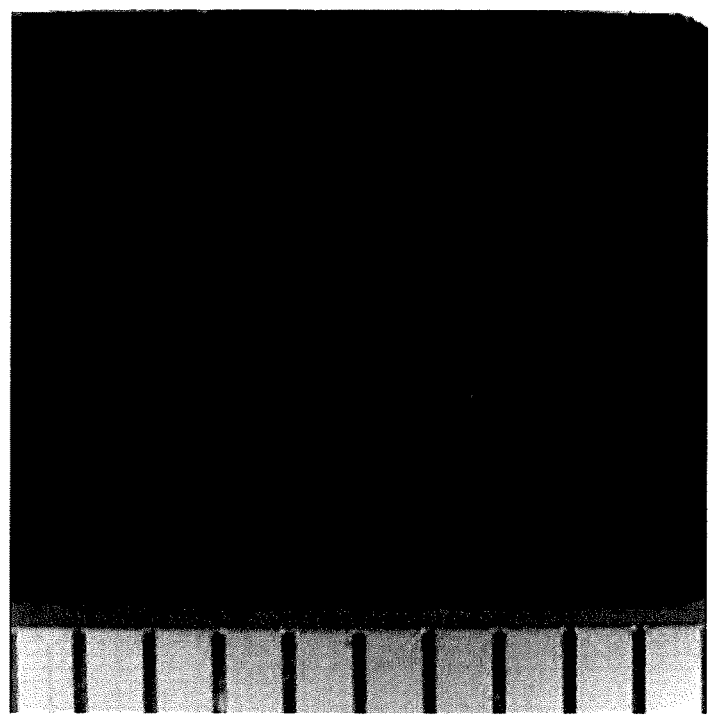
FIG. 1 shows an example in which the result of the evaluation of resistance to acids and corrosion in the Example is ○.

The polyamide resin composition of the present invention is a polyamide resin composition which comprises:
a polyamide resin (component A),
glass (component C), and
optionally a styrene polymer (component B1) and a modified polyphenylene ether (component B2), the component B1 having a deflection temperature under load of 140 to 280° C.

the total amount of the components A, B1, and B2 and the amount of the component C being, respectively, 40 to 95% by weight and 60 to 5% by weight, based on 100% by weight of the polyamide resin composition, the amount of the component A and the total amount of the components B1 and B2 being, respectively, 50 to 100% by weight and 50 to 0% by weight, based on 100% by weight of the whole of the components A, B1, and B2, wherein when the component C contains glass containing no boron oxide (component C1), the amount of the component C1 is 60 to 5% by weight, based on 100% by weight of the polyamide resin composition, wherein when the component C does not contain the component C1, the component A is a polyoxamide resin, or the amount of the component A and the total amount of the components B1 and B2 are, respectively, 50 to 90% by weight and 50 to 10% by weight, based on 100% by weight of the whole of the components A, B1, and B2.

The polyamide resin composition of the present invention (hereinafter, frequently referred to as "polyamide resin composition") includes:

the first embodiment wherein the component C contains glass containing no boron oxide (component C1), and the amount of the component C1 is 60 to 5% by weight, based on 100% by weight of the polyamide resin composition, the second embodiment wherein the component C does not contain the component C1, and the component A is a polyoxamide resin, and the third embodiment wherein the component C does not contain the component C1, and the amount of the component A and the total amount of the components B1 and B2 are, respectively, 50 to 90% by weight and 50 to 10% by weight, based on 100% by weight of the whole of the components A, B1, and B2.

From the viewpoint of achieving excellent acid resistance and the reduction of weight, the first embodiment and the second embodiment are more preferred, and the first embodiment is further preferred.

(1) Component A (Polyamide Resin)

With respect to component A in the present invention, there can be mentioned polyamide comprised of a condensation polymerization product of a diamine and a dicarboxylic acid (dibasic acid), a polyamide made from a lactam or an aminocarboxylic acid, or a polyamide comprised of a condensation polymerization product or a copolymer of two or more of them.

Examples of diamines include aliphatic diamines, such as tetramethylenediamine, hexamethylenediamine, octamethylenediamine, nonamethylenediamine, undecamethylenediamine, and dodecamethylenediamine, and diamines having an aromatic cyclic structure, such as metaxylenediamine.

Examples of dicarboxylic acids include aliphatic dicarboxylic acids, such as adipic acid, heptanedicarboxylic acid, octanedicarboxylic acid, nonanedicarboxylic acid, undecanedicarboxylic acid, and dodecanedicarboxylic acid, and dicarboxylic acids having an aromatic cyclic structure, such as terephthalic acid and isophthalic acid.

The lactam is a lactam having 6 to 12 carbon atoms, and the aminocarboxylic acid is an aminocarboxylic acid having 6 to 12 carbon atoms. Examples include 6-aminocaproic acid, 7-aminoheptanoic acid, 11-aminoundecanoic acid, 12-aminododecanoic acid, α-pyrrolidone, ε-caprolactam, ω-laurolactam, and ε-enanthlactam.

Component A has a role of a base material of the polyamide resin composition in surely causing the composition to collectively have mechanical strength, such as strength, heat resistance, and moldability, and, also from the viewpoint of reducing the cost, specific examples of component A, e.g., homopolymers, such as polyamide 6, polyamide 11, polyamide 12, polyamide 66, polyamide 46, polyamide 610, polyamide 612, polyamide 912, polyamide 1010 and polyamide 1212, and copolymers, such as polyamide 6/66, polyamide 6/12 and polyamide 11/12, are preferably used.

The above-mentioned names of specific examples of component A are based on JIS K6920-1: 2000 "Plastics—Polyamide (PA) molding and extrusion materials—Part 1: Designation".

From the viewpoint of the viscosity and water absorption of the resultant composition, polyamide 11 and polyamide 12 are desired.

From the viewpoint of surely achieving stable mechanical strength, preferred are polyamide 6, polyamide 66, polyamide 6/66, polyamide 610, polyamide 612, polyamide 1212, polyamide 1010, polyamide 912, polyamide 46, polyamide 6/12, and polyamide 11/12, and from the viewpoint of achieving both the stable mechanical strength and the reduced cost, polyamide 6 and polyamide 66 are more preferred.

Further, from the viewpoint of achieving excellent acid resistance, component A is further preferably a polyoxamide resin made using oxalic acid as a dicarboxylic acid component.

As a source of oxalic acid for the polyoxamide resin, an oxalic acid diester is used, and, with respect to the oxalic acid diester, there is no particular limitation as long as it has a reactivity with an amino group, and examples include oxalic acid diesters of an aliphatic monohydric alcohol, such as dimethyl oxalate, diethyl oxalate, di-n-(or i-)propyl oxalate, and di-n-(or i-, or t-)butyl oxalate; oxalic acid diesters of an alicyclic alcohol, such as dicyclohexyl oxalate; and oxalic acid diesters of an aromatic alcohol, such as diphenyl oxalate. Of these, an oxalic acid diester capable of forming an alcohol which can be completely removed at the temperature of the subsequent melt polymerization or solid phase polymerization is preferably used. Examples of such oxalic acid diesters include dimethyl oxalate, diethyl oxalate, di-n-(or i-)propyl oxalate, and di-n-(or i-, or t-)butyl oxalate. Further, diethyl oxalate, di-n-(or i-)propyl oxalate, or di-n-(or i-, or t-)butyl oxalate, which is in a liquid state at room temperature and is easily mixed with a diamine by kneading, is especially preferably used.

As examples of diamines, which are a raw material for the polyoxamide resin as component A, there can be mentioned one member or mixtures of two or more arbitrary members selected from aliphatic diamines, such as ethylenediamine, propylenediamine, 1,4-butanediamine, 1,5-pentanediamine, 1,6-hexanediamine, 1,7-heptanediamine, 1,8-octanediamine, 1,9-nonanediamine, 1,10-decanediamine, 1,12-dodecanediamine, 2-methyl-1,5-pentanediamine, 3-methyl-1,5-pentanediamine, 2,2,4-trimethyl-1,6-hexanediamine, 2,4,4-trimethyl-1,6-hexanediamine, 2-methyl-1,8-octanediamine, and 5-methyl-1,9-nonanediamine, alicyclic diamines, such as cyclohexanediamine, methylcyclohexanediamine, and isophoronediamine, and aromatic diamines, such as p-phenylenediamine, m-phenylenediamine, xylenediamine, 4,4'-diaminodiphenylmethane, 4,4'-diaminodiphenyl sulfone, and 4,4'-diaminodiphenyl ether.

In component A, in addition to the polyoxamide resin, a polyamide resin, such as an aromatic polyamide, an aliphatic polyamide, or an alicyclic polyamide, can be mixed into component A.

(2) Component B1 (Styrene Polymer)

With respect to the styrene polymer, from the viewpoint of achieving excellent acid resistance, the polyamide resin composition preferably comprises a styrene polymer having a deflection temperature under load of 140 to 280° C., preferably 150 to 280° C., more preferably 160 to 280° C., further preferably 170 to 280° C.

The styrene polymer means a polymer comprising structure units derived from a styrene monomer or a styrene based monomer having a substituted phenyl in which hydrogen in the phenyl group of styrene is further substituted.

The deflection temperature under load is a yardstick for the heat resistance of the styrene polymer, and, when the styrene polymer is preferably a styrene polymer having a syndiotactic structure (hereinafter, frequently referred to as "SPS"), the styrene polymer can achieve a deflection temperature under load in the above-mentioned preferred range.

The deflection temperature under load is defined as a temperature, as measured in accordance with ASTM D-648, at which a test piece having a size of length: 5 inches×width: ½ inch×thickness: ½ inch is deflected by 0.25 mm when the temperature of the test piece is elevated from room temperature at a temperature elevation rate of 2° C./min under conditions such that the mold temperature is 150° C. and the load is 0.46 MPa.

SPS is commercially available, for example, from Idemitsu Kosan Co., Ltd. in the trade name of "XAREC".

In the styrene polymer having a syndiotactic structure, the term "syndiotactic structure" means a stereostructure of a syndiotactic structure, namely, a stereostructure in which side chains, such as a phenyl group and a substituted phenyl group, are positioned alternately in different directions with respect to the principal chain formed from a carbon-carbon bond, and the tacticity is preferably quantitatively determined by a nuclear magnetic resonance method using isotopic carbon ($^{13}$C-NMR method).

The tacticity determined by a $^{13}$C-NMR method can be indicated by the ratio of a plurality of continuous units present in the polymer, for example, dyad for two units, triad for three units, or pentad for five units, and the term "styrene copolymer having a syndiotactic structure" used in the present invention means polystyrene, poly(alkylstyrene), poly(halogenated styrene), poly(halogenated alkylstyrene), poly(alkoxystyrene), or poly(vinyl benzoate), a hydrogenated polymer thereof, a mixture thereof, or a copolymer comprised mainly of them, each having syndiotacticity which is generally racemic dyad in an amount of 75% or more, preferably 85% or more, or racemic pentad in an amount of 30% or more, preferably 50% or more.

Examples of poly(alkylstyrene) include poly(methylstyrene), poly(ethylstyrene), poly(isopropylstyrene), poly(tert-butylstyrene), poly(phenylstyrene), poly(vinylnaphthalene), and poly(vinylstyrene), and examples of poly(halogenated styrene) include poly(chlorostyrene), poly(bromostyrene), and poly(fluorostyrene). Examples of poly(halogenated alkylstyrene) include poly(chloromethylstyrene).

Examples of poly(alkoxystyrene) include poly(methoxystyrene) and poly(ethoxystyrene).

More preferred examples of styrene polymers include polystyrene, poly(p-methylstyrene), poly(m-methylstyrene), poly(p-tert-butylstyrene), poly(p-chlorostyrene), poly(m-chlorostyrene), poly(p-fluorostyrene), hydrogenated polystyrene, and copolymers comprising structure units for these polymers.

The styrene polymers can be used individually or in combination of two or more of them.

With respect to the molecular weight of the styrene polymer, there is no particular limitation, and, from the viewpoint of obtaining a polyamide resin composition or a molded article thereof having thermal properties and mechanical properties in the preferred ranges, the weight average molecular weight of the styrene polymer is preferably 10,000 or more, more preferably 50,000 or more, and preferably 400,000 or less, more preferably 300,000 or less, further preferably 10,000 to 400,000, still further preferably 50,000 to 300,000. Further, the width of the molecular weight distribution of the styrene polymer is not limited, and various molecular weight distributions can be applied to the styrene polymer.

The weight average molecular weight was determined by gel permeation chromatography (GPC) using 1,2,4-trichlorobenzene as a solvent at 130° C.

The styrene polymer having a syndiotactic structure can be produced by, for example, polymerizing a styrene (based) monomer in an inert hydrocarbon solvent or without a solvent using as a catalyst a titanium compound and a condensation product of water and a trialkylaluminum (Japanese Unexamined Patent Publication No. Sho 62-187708).

The poly(halogenated alkylstyrene) can be obtained by the method described in Japanese Unexamined Patent Publication No. Hei 1-46912, and the above-mentioned hydrogenated polymer can be obtained by, e.g., the method described in Japanese Unexamined Patent Publication No. Hei 1-178505.

(3) Component B2 (Modified Polyphenylene Ether)

Component B2 causes component B1 to be stably dispersed in the polyamide resin composition to improve the strength of the interface between component B1 and the polyamide resin, making stable the mechanical properties and acid resistance of the polyamide resin composition.

With respect to component B2, from the viewpoint of stabilizing the dispersibility of component B1 and the mechanical properties and acid resistance of the polyamide resin composition, maleic anhydride-modified polyphenylene ether and/or fumaric acid-modified polyphenylene ether is preferred, and fumaric acid-modified polyphenylene ether is more preferred.

From the viewpoint of causing component B1 to be stably dispersed to improve the strength of the interface between component B1 and the polyamide resin, making stable the mechanical properties and acid resistance of the polyamide resin composition, the component B1/component B2 weight ratio (B1/B2) is preferably 5/95 to 90/10, more preferably 26/74 to 88/12, further preferably 76/24 to 85/15.

(4) Component C (Glass)

The glass, which is component C used in the polyamide resin composition of the present invention (hereinafter, frequently referred to as "polyamide resin composition"), indicates aluminoborosilicate glass which is general glass {e.g., E-glass (generally called non-alkali glass)}, more preferably glass containing no boron oxide (component C1) as compared to E-glass from the viewpoint of achieving excellent acid resistance. The glass may be in the form of fibers, flakes, beads, or balloon, and, from the viewpoint of obtaining a strength and the like, glass fibers are especially preferred.

The glass containing no boron oxide, which is component C1 used in the present invention, indicates glass containing no boron oxide, as compared to E-glass which is general glass. Component C1 may be in the form of fibers, flakes, beads, or balloon, and, from the viewpoint of obtaining a strength and the like, glass fibers are especially preferred.

(5) Thermoplastic Resin Other Than the Polyamide Resin

In the polyamide resin composition, a thermoplastic resin which is other than polyamide resin component A and which has a low water absorption and a chemical resistance may be added.

As preferred examples, there can be mentioned at least one thermoplastic resin selected from a styrene resin, such as a polystyrene resin other than component B1 or an ABS resin, a polyphenylene phenylene ether resin other than component B2, a polyester resin, a polyphenylene sulfide resin, a polyphenylene oxide resin, a polycarbonate resin, a polylactic acid resin, a polyacetal resin, a polysulfone resin, a polyethylene tetrafluoride resin, a polyether imide resin, a polyamide-imide resin, a polyimide resin, a polyether sulfone resin, a polyether ketone resin, a polythioether ketone resin, a polyether ether ketone resin, a polyethylene resin, a polypropylene resin, a rubber polymer, and a polyalkylene oxide resin.

For improving the reactivity of the polyamide resin with a resin other than the polyamide resin, at least one resin other than the polyamide resin, which has a modified end group, is more preferably used.

Further, in the polyamide resin composition of the present invention, an additional component, for example, a function imparting agent, such as a plasticizer, a high-impact material, a heat-resistant material, a foaming agent, a weathering agent, a nucleating agent, a crystallization accelerator, a release agent, a lubricant, a fluidity-improving agent, an antistatic agent, a flame retardant, an auxiliary for flame retardant, a pigment, or a dye, can be incorporated in such an appropriate amount that the effects of the present invention are not sacrificed.

(6) Polyamide Resin Composition

With respect to the amounts of components A, B1, B2, and C incorporated into the polyamide resin composition, the total amount of components A, B1, and B2 and the amount of component C are, respectively, 40 to 95% by weight and 60 to 5% by weight, based on 100% by weight of the polyamide resin composition, and the amount of component A and the total amount of components B1 and B2 are, respectively, 50 to 100% by weight and 50 to 0% by weight, based on 100% by weight of the whole of the components A, B1, and B2.

When the polyamide resin composition does not contain components B1 and B2, from the viewpoint of achieving excellent acid resistance and the reduction of weight, the amount of component (A) incorporated into the polyamide resin composition is 40 to 95% by weight, more preferably 55 to 90% by weight, further preferably 55 to 80% by weight, based on 100% by weight of the polyamide resin composition.

From the viewpoint of achieving excellent acid resistance and the reduction of weight, the total amount of component A and the thermoplastic resin other than component A incorporated into the polyamide resin composition is preferably 40 to 95% by weight, more preferably 55 to 90% by weight, further preferably 55 to 80% by weight, based on 100% by weight of the polyamide resin composition.

When the polyamide resin composition contains components B1 and B2, from the viewpoint of achieving excellent acid resistance and the reduction of weight, the amount of component A and the total amount of components B1 and B2 are, respectively, 50 to 100% by weight and 50 to 0% by weight (excluding 0% by weight), based on 100% by weight of components A, B1, and B2;

it is preferred that the amount of component A and the total amount of components B1 and B2 are, respectively, 50 to 90% by weight and 50 to 10% by weight, based on 100% by weight of the whole of components A, B1, and B2;

it is more preferred that the amount of component A and the total amount of components B1 and B2 are, respectively, 60 to 80% by weight and 40 to 20% by weight, based on the 100% by weight of the whole of components A, B1, and B2; and it is further preferred that the amount of component A and the total amount of components B1 and B2 are, respectively, 65 to 75% by weight and 35 to 25% by weight, based on 100% by weight of the whole of components A, B1, and B2.

From the viewpoint of achieving excellent acid resistance, the reduction of weight, and excellent moldability, the amount of component C incorporated into the polyamide resin composition is 60 to 5% by weight, preferably 50 to 10% by weight, more preferably 45 to 10% by weight, further preferably 40 to 20% by weight, further preferably 35 to 25% by weight, based on 100% by weight of the polyamide resin composition.

When component C contains component C1, from the viewpoint of achieving excellent acid resistance, the reduction of weight, and excellent moldability, the amount of component C1 incorporated into the polyamide resin composition is 60 to 5% by weight, preferably 50 to 10% by weight, more preferably 45 to 10% by weight, further preferably 40 to 20% by weight, further preferably 35 to 25% by weight, based on 100% by weight of the polyamide resin composition.

From the viewpoint of achieving excellent acid resistance, component C1 is preferably present in an amount of 8.4 to 100% by weight, more preferably 16.7 to 100% by weight, further preferably 33.4 to 100% by weight, further preferably 41.7 to 100% by weight, further preferably 58.4 to 100% by weight, further preferably 66.7 to 100% by weight, further preferably 75.0 to 100% by weight, further preferably 84 to 100% by weight, further preferably 100% by weight, based on 100% by weight of component C.

(7) Polyamide Resin Composition of the First Embodiment

In the polyamide resin composition of the first embodiment, component C contains component C1, and the total amount of components A, B1, and B2 or the amount of component A and the amount of component C1 are, respectively, 40 to 95% by weight and 60 to 5% by weight, based on 100% by weight of the polyamide resin composition, and the amount of component A and the total amount of components B1 and B2 are, respectively, 50 to 100% by weight and 50 to 0% by weight, based on 100% by weight of the whole of components A, B1, and B2.

In the more preferred first embodiment, the total amount of components A, B1, and B2 and the amount of component C1 are, respectively, 40 to 95% by weight and 60 to 5% by weight, based on 100% by weight of the whole of components A, B1, B2, and C1;

it is preferred that the total amount of components A, B1, and B2 and the amount of component C1 are, respectively, 55 to 90% by weight and 45 to 10% by weight, based on 100% by weight of the whole of components A, B1, B2, and C1;

it is more preferred that the total amount of components A, B1, and B2 and the amount of component C1 are, respectively, 55 to 80% by weight and 45 to 20% by weight, based on 100% by weight of the whole of components A, B1, B2, and C1;

it is further preferred that the total amount of components A, B1, and B2 and the amount of component C1 are, respectively, 60 to 80% by weight and 40 to 20% by weight, based on 100% by weight of the whole of components A, B1, B2, and C1; and it is further preferred that the total amount of components A, B1, and B2 and the amount of component C1 are, respectively, 65 to 75% by weight and 35 to 25% by weight, based on 100% by weight of the whole of components A, B1, B2, and C1, or the amount of component A and the amount of component C1 are, respectively, 40 to 95% by weight and 60 to 5% by weight, based on 100% by weight of the whole of components A and C;

it is preferred that the amount of component A and the amount of component C1 are, respectively, 55 to 90% by weight and 45 to 10% by weight, based on 100% by weight of the whole of components A and C;

it is more preferred that the amount of component A and the amount of component C1 are, respectively, 55 to 80% by weight and 45 to 20% by weight, based on 100% by weight of the whole of components A and C;

it is further preferred that the amount of component A and the amount of component C1 are, respectively, 60 to 80% by weight and 40 to 20% by weight, based on 100% by weight of the whole of components A and C; and it is further preferred that the amount of component A and the amount of component C1 are, respectively, 65 to 75% by weight and 35 to 25% by weight, based on 100% by weight of the whole of components A and C.

In the first embodiment, from the viewpoint of achieving excellent acid resistance, the reduction of weight, and excellent moldability, the amount of component C1 incorporated into the polyamide resin composition is 60 to 5% by weight, preferably 50 to 10% by weight, more preferably 45 to 10% by weight, further preferably 40 to 20% by weight, further preferably 35 to 25% by weight, based on 100% by weight of the polyamide resin composition, preferably based on 100% by weight of the whole of components A, B1, B2, and C or 100% by weight of the whole of components A and C.

Further, from the viewpoint of achieving excellent acid resistance, component C1 is preferably present in an amount of 8.4 to 100% by weight, more preferably 16.7 to 100% by weight, further preferably 33.4 to 100% by weight, further preferably 41.7 to 100% by weight, further preferably 58.4 to 100% by weight, further preferably 66.7 to 100% by weight, further preferably 75.0 to 100% by weight, further preferably 84 to 100% by weight, further preferably 100% by weight, based on 100% by weight of component C.

The polyamide resin composition of the first embodiment may contain or may not contain component B1 and component B2, and, from the viewpoint of achieving excellent acid resistance and the reduction of weight, the composition preferably contains component B1 and component B2, and, in such a case, the amount of component A and the total amount of components B1 and B2 are, respectively, 50 to 100% by weight and 50 to 0% by weight (excluding 0% by weight), based on 100% by weight of the whole of components A, B1, and B2;

it is preferred that the amount of component A and the total amount of components B1 and B2 are, respectively, 50 to 90% by weight and 50 to 10% by weight, based on 100% by weight of the whole of components A, B1, and B2;

it is more preferred that the amount of component A and the total amount of components B1 and B2 are, respectively, 60 to 80% by weight and 40 to 20% by weight, based on 100% by weight of the whole of components A, B1, and B2; and it is further preferred that the amount of component A and the total amount of components B1 and B2 are, respectively, 65 to 75% by weight and 35 to 25% by weight, based on 100% by weight of the whole of components A, B1, and B2.

In the first embodiment, component A may contain or may not contain a polyoxamide resin, and, from the viewpoint of achieving excellent acid resistance and the reduction of weight, component A preferably contains a polyoxamide resin, and, in such a case, the amount of the polyoxamide resin incorporated into the polyamide resin composition is preferably 2 to 95% by weight, more preferably 3 to 90% by weight, further preferably 3 to 80% by weight, further preferably 3 to 75% by weight, based on 100% by weight of the polyamide resin composition.

The polyoxamide resin is preferably present in an amount of 5 to 100% by weight, more preferably 30 to 100% by weight, further preferably 60 to 100% by weight, further preferably 100% by weight, based on 100% by weight of component A.

(8) Polyamide Resin Composition of the Second Embodiment

In the polyamide resin composition of the second embodiment, component C does not contain component C1 and component A is a polyoxamide resin.

In the second embodiment, component A is a polyoxamide resin, and, from the viewpoint of achieving excellent acid resistance and the reduction of weight, the amount of the polyoxamide resin incorporated into the polyamide resin composition is preferably 40 to 95% by weight, more preferably 55 to 90% by weight, further preferably 55 to 80% by weight, based on 100% by weight of the polyamide resin composition.

In the more preferred second embodiment, it is preferred that the amount of the polyoxamide resin and the amount of component C are, respectively, 40 to 95% by weight and 60 to 5% by weight, based on 100% by weight of the whole of the polyoxamide resin and component C;

it is more preferred that the amount of the polyoxamide resin and the amount of component C are, respectively, 55 to 90% by weight and 45 to 10% by weight, based on 100% by weight of the whole of the polyoxamide resin and component C;

it is further preferred that the amount of the polyoxamide resin and the amount of component C are, respectively, 55 to 80% by weight and 45 to 20% by weight, based on 100% by weight of the whole of the polyoxamide resin and component C;

it is further preferred that the amount of the polyoxamide resin and the amount of component C are, respectively, 60 to 80% by weight and 40 to 20% by weight, based on 100% by weight of the whole of the polyoxamide resin and component C; and it is further preferred that the amount of the polyoxamide resin and the amount of component C are, respectively, 65 to 75% by weight and 35 to 25% by weight, based on 100% by weight of the whole of the polyoxamide resin and component C.

In the second embodiment, the composition may contain or may not contain component B1 and component B2, and, from the viewpoint of achieving excellent acid resistance and the reduction of weight, the composition preferably contains component B1 and component B2, and, in such a case, the amount of component A and the total amount of components B1 and B2 are, respectively, 50 to 100% by weight and 50 to 0% by weight (excluding 0% by weight), based on 100% by weight of the whole of components A, B1, and B2;

it is preferred that the amount of component A and the total amount of components B1 and B2 are, respectively, 50 to 90% by weight and 50 to 10% by weight, based on 100% by weight of the whole of components A, B1, and B2;

it is more preferred that the amount of component A and the total amount of components B1 and B2 are, respectively, 60 to 80% by weight and 40 to 20% by weight, based on 100% by weight of the whole of components A, B1, and B2; and it is further preferred that the amount of component A and the total amount of components B1 and B2 are, respectively, 65 to 75% by weight and 35 to 25% by weight, based on 100% by weight of the whole of components A, B1, and B2.

(9) Polyamide Resin Composition of the Third Embodiment

In the poly amide resin composition of the third embodiment, component C does not contain component C1, and the amount of component A and the total amount of components B1 and B2 are, respectively, 50 to 90% by weight and 50 to 10% by weight, based on 100% by weight of the whole of components A, B1, and B2.

In the third embodiment, from the viewpoint of achieving excellent acid resistance and the reduction of weight, it is preferred that the amount of component A and the total amount of components B1 and B2 are, respectively, 60 to 80% by weight and 40 to 20% by weight, based on 100% by weight of the whole of components A, B1, and B2; and it is more preferred that the amount of component A and the total amount of components B1 and B2 are, respectively, 65 to 75% by weight and 35 to 25% by weight, based on 100% by weight of the whole of components A, B1, and B2.

In the more preferred third embodiment, the total amount of components A, B1 and B2 and the amount of component C are, respectively, 40 to 95% by weight and 60 to 5% by weight, based on 100% by weight of the whole of components A, B1, B2, and C;

it is preferred that the total amount of components A, B1, and B2 and the amount of component C are, respectively, 55 to 90% by weight and 45 to 10% by weight, based on 100% by weight of the whole of components A, B1, B2, and C; it is more preferred that the total amount of components A, B1, and B2 and the amount of component C are, respectively, 55 to 80% by weight and 45 to 20% by weight, based on 100% by weight of the whole of components A, B1, B2, and C;

it is further preferred that the total amount of components A, B1, and B2 and the amount of component C are, respectively, 60 to 80% by weight and 40 to 20% by weight, based on 100% by weight of the whole of components A, B1, B2, and C; and it is further preferred that the total amount of components A, B1, and B2 and the amount of component C are, respectively, 65 to 75% by weight and 35 to 25% by weight, based on 100% by weight of the whole of components A, B1, B2, and C.

In the third embodiment, component A may contain or may not contain a polyoxamide resin, and, from the viewpoint of achieving excellent acid resistance and the reduction of weight, component A preferably contains a polyoxamide resin, and, in such a case, the amount of the polyoxamide resin incorporated into the polyamide resin composition is preferably 2 to 95% by weight, more preferably 3 to 90% by weight, further preferably 3 to 80% by weight, further preferably 3 to 75% by weight, based on 100% by weight of the polyamide resin composition.

The polyoxamide resin is preferably present in an amount of 5 to 100% by weight, more preferably 30 to 100% by weight, further preferably 60 to 100% by weight, further preferably 100% by weight, based on 100% by weight of component A.

Further, in the polyamide resin composition according to the first to third embodiments of the present invention, an additional component, for example, a function imparting agent, such as a plasticizer, a high-impact material, a heat-resistant material, a foaming agent, a weathering agent, a nucleating agent, a crystallization accelerator, a release agent, a lubricant, a fluidity-improving agent, an antistatic agent, a flame retardant, an auxiliary for flame retardant, a pigment, or a dye, can be incorporated in such an appropriate amount that the effects aimed at by the present invention are not sacrificed.

With respect to the method for producing the polyamide resin composition of the present invention, for example, the following method can be used.

Component A or C, and, if necessary, a polyoxamide, B1 and B2 and/or C1 are melt-kneaded using a generally known melt-kneader, such as a single-screw or twin-screw extruder, a Banbury mixer, a kneader, or a mixing roll. For example, using a twin-screw extruder, there may be used any of a method in which all the raw materials are mixed together and then melt-kneaded, a method in which part of the raw materials are mixed together and then melt-kneaded, and the remaining raw materials are mixed into the resultant mixture and melt-kneaded together, and a method in which part of the raw materials are mixed together and then, the remaining raw materials are mixed using a side feeder into the mixture being melt-kneaded.

With respect to the method for producing a molded article from the polyamide resin composition of the present invention, using a molding machine generally used for thermoplastic resin, e.g., an extruding machine, a blow molding machine, a compression molding machine, or an injection molding machine, a molded article in various forms can be produced.

The polyamide resin composition of the present invention is advantageously used in a part for exhaust gas passing therethrough by EGR (EGR part), which is required to have an acid resistance, such as an intake manifold, an EGR delivery pipe, an EGR pipe, an EGR valve, or an EGR cooler part. In applications of EGR parts, for example, parts for automobile are preferred, and, of these, preferred are EGR part applications, such as an intake manifold, an EGR delivery pipe, an EGR cooler part, an EGR pipe, and an EGR valve, and engine room parts including related peripheral parts, such as an air cleaner, a resonator, a fuel rail, a throttle body and valve, an air flow meter, a cylinder head cover, a vapor canister, a fuel strainer, a battery, and a terminal cover.

These parts for exhaust gas passing therethrough by an EGR system can be obtained by a method for producing a part, which comprises shaping the polyamide resin composition of the present invention, and further an automobile comprising a part for exhaust gas passing therethrough by an EGR system can be produced by incorporating the obtained part for exhaust gas passing therethrough by an EGR system into, e.g., an engine room.

EXAMPLES

Hereinbelow, the present invention will be described in more detail with reference to the following Examples and Comparative Examples, which should not be construed as limiting the scope of the present invention.

Figure 2:
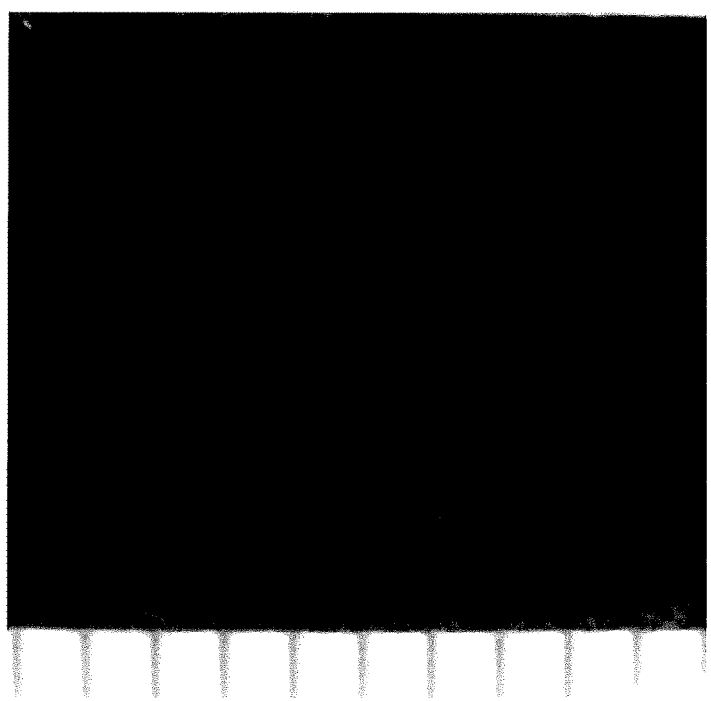
FIG. 2 shows an example in which the result of the evaluation of resistance to acids and corrosion in the Example is Δ.
Figure 3:
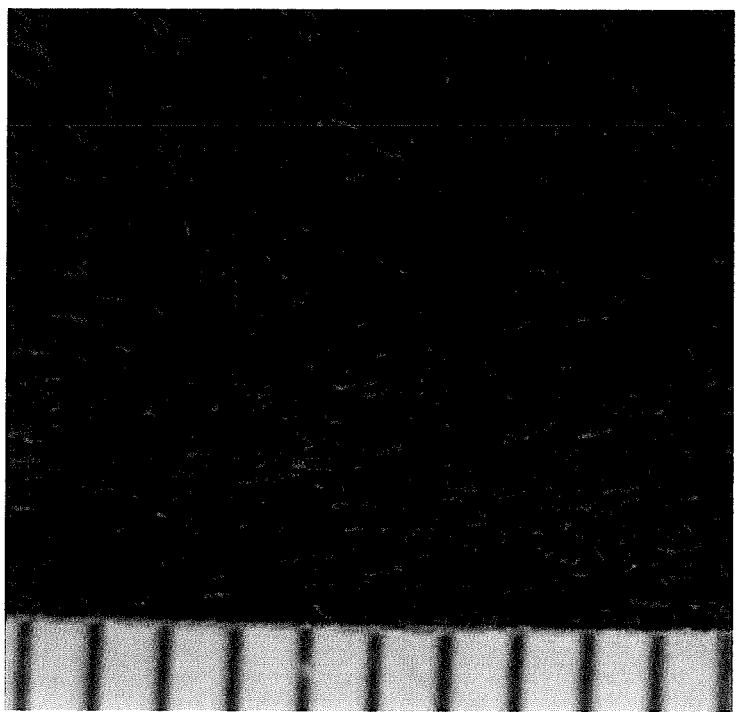
FIG. 3 shows an example in which the result of the evaluation of resistance to acids and corrosion in the Example is ×.

Methods for measuring physical properties of the resins and molded articles used in the Examples and Comparative Examples are shown below.
(1) Tensile strength and tensile strain at break: A test was conducted in accordance with ISO 527-1, 2 using a test specimen having a thickness of 4 mm at room temperature at a rate of pulling of 5 mm/min (an average of measurements for n=5 was determined).
(2) Modulus in tension: A test was conducted in accordance with ISO 527-1, 2 using a test specimen having a thickness of 4 mm at room temperature at a rate of pulling of 1 mm/min (an average of measurements for n=5 was determined).
A tensile test was conducted in accordance with ISO 11403-3 at a rate of pulling of 1 mm/min.
(3) Charpy impact strength: An edgewise impact test was conducted in accordance with ISO 179-1 using an A-notched specimen having a thickness of 4 mm at room temperature (an average of measurements for n=10 was determined).
(4) Resistance to acids and corrosion: An ISO Type-C specimen described in ISO 294-2 was subjected to immersion treatment under the five conditions shown below, i.e., treatment condition-A, treatment condition-D, treatment condition-E, treatment condition-B, and treatment condition-C.
Treatment condition-A: The specimen was immersed in a 0.1 N aqueous solution of sulfuric acid for 120 hours.
Treatment condition-D: The specimen was immersed in a 0.1 N aqueous solution of sulfuric acid for 240 hours.
Treatment condition-E: The specimen was immersed in a 0.5 N aqueous solution of sulfuric acid for 40 hours.
Treatment condition-B: The specimen was immersed in a 0.5 N aqueous solution of sulfuric acid for 120 hours.
Treatment condition-C: The specimen was immersed in a 0.5 N aqueous solution of sulfuric acid for 240 hours.
The specimen obtained after the immersion was washed with distilled water, and dried in a vacuum dryer at 80° C. so that the moisture content of the specimen became 0.2% or less, and the resultant specimen was observed in respect of the appearance and subjected to tensile test to determine a tensile strength maintaining ratio.
The resistance to acids and corrosion was evaluated in accordance with the following criteria:
◯: No change is found in the appearance of the specimen (the surface state of the ISO T e-C specimen has no change accompanied by whitening) (see, for example, FIG. 1);
Δ: The surface of the specimen is slightly roughened (the surface gloss of the ISO Type-C specimen is slightly reduced, and a change accompanied by slight whitening is recognized in the appearance of the specimen) (see, for example, FIG. 2); and
×: The surface of the specimen is roughened (the surface gloss of the ISO Type-C specimen is markedly reduced, and a marked change accompanied by collective whitening is recognized in the appearance of the specimen) (see, for example, FIG. 3).

Component A: Polyamide resin
Component A1: Polyamide 92 (product made on an experimental basis)
Component A2: Polyamide 6 (UBE Nylon 1015B, manufactured by Ube Industries, Ltd.)
Component A3: Polyamide 66 (UBE Nylon 2020B, manufactured by Ube Industries, Ltd.)

Polyamide 92 is a polyoxamide resin and was produced by the following method.

Into an autoclave having an internal capacity of 150 liters and being equipped with an agitator, a thermometer, a torque meter, a pressure meter, a raw material inlet directly connected to a diaphragm pump, a nitrogen gas inlet, a pressure release port, a pressure controller, and a polymer withdrawal outlet was charged 28.40 kg (140.4 mol) of dibutyl oxalate, and the autoclave was purged with nitrogen gas, and then the temperature in the system was elevated under a pressure while stirring. After the temperature of dibutyl oxalate reached 100° C., a mixture of 18.89 kg (119.3 mol) of 1,9-nonanediamine and 3.34 kg (21.1 mol) of 2-methyl-1,8-octanediamine (wherein the 1,9-nonanediamine:2-methyl-1,8-octanediamine molar ratio was 85:15) was fed into the reactor by means of the diaphragm pump simultaneously with the temperature elevation.

Immediately after feeding the mixture, the internal pressure of the autoclave was increased to 0.35 MPa due to butanol formed by a condensation polymerization reaction, and the temperature of the condensation polymerization product was increased to about 170° C.

Then, the temperature was increased to 235° C. over one hour, whereupon the internal pressure was adjusted to 0.5 MPa while withdrawing the formed butanol through the pressure release port.

Immediately after the temperature of the condensation polymerization product reached 235° C., butanol was withdrawn through the pressure release port so that the internal pressure became atmospheric pressure. After the internal pressure reached atmospheric pressure, the temperature elevation was started while flowing nitrogen gas through the autoclave, and the temperature of the condensation polymerization product was elevated to 260° C. over about one hour to effect a reaction at 260° C. for 4.5 hours.

Then, the stirring was stopped, and the system was under a pressure at 1 MPa using nitrogen and allowed to stand for about 10 minutes, and then the internal pressure was reduced to 0.5 MPa, and the resultant condensation polymerization product was withdrawn in the form of a string through the withdrawal outlet at the lower portion of the autoclave.

The polymerization product in a string form was immediately cooled with water, and the cooled resin in a string form was pelletized using a pelletizer.

The obtained polyamide was a white tough polymer and had a relative viscosity ($\eta r$) of 3.20.

Component B1: Syndiotactic polystyrene resin (deflection temperature under load: 189° C.; weight average molecular weight: 190,000; XAREC 130ZC, manufactured by Idemitsu Kosan Co., Ltd.; this resin is indicated by "SPS" in Table 1)
Component B2: Modified polyphenylene ether resin (CX-1, manufactured by Idemitsu Kosan Co., Ltd.; this resin is indicated by "m-PPE" in Table 1)

Component C: Glass fibers

Component C1: Glass 1 containing no boron oxide (CS 983-10P 4MM 2406#GBB ADV, manufactured by Owens Corning Japan Ltd.)

Component C1: Glass 2 containing no boron oxide (CSE3J-459, manufactured by Nitto Boseki Co., Ltd.)

Component C2: E-glass (CS3J-454, manufactured by Nitto Boseki Co., Ltd.)

Component C3: E-glass (ECS03T-289H, manufactured by Nippon Electric Glass Co., Ltd.)

Example 1

The polyamide resin (component A2) and the glass fibers comprising glass 1 containing no boron oxide (component C1) shown in Table 1 were melt-kneaded using a twin-screw kneader TEX44HCT to prepare pellets of a desired polyamide resin composition.

Then, the obtained pellets were subjected to injection molding under conditions such that the temperature of the molten resin was 290° C., the mold temperature was 80° C., the average injection speed in the mold was 250 mm/sec, and the pressure was maintained at 60 MPa×20 sec to prepare specimens for the respective tests, and the measurement of various physical properties and the evaluation of resistance to acids and corrosion were performed with respect the prepared specimens.

Example 2

A test was performed under substantially the same conditions as in Example 1 except that the polyamide resin (component A3) shown in Table 1 was used.

Example 3

A test was performed under substantially the same conditions as in Example 1 except that the glass fibers comprising glass 2 containing no boron oxide (component C1) shown in Table 1 were used.

Example 4

A test was performed under substantially the same conditions as in Example 3 except that the polyamide resin (component A3) shown in Table 1 was used.

Example 5

The polyoxamide resin (polyamide 92) (component A1) and the glass fibers comprising glass 1 containing no boron oxide (component C1) shown in Table 1 were melt-kneaded using a twin-screw kneader TEX44HCT to prepare pellets of a desired polyoxamide resin composition.

Then, the obtained pellets were subjected to injection molding under conditions such that the temperature of the molten resin was 290° C., the mold temperature was 80° C., the average injection speed in the mold was 250 min/sec, and the pressure was maintained at 60 MPa×20 sec to prepare specimens for the respective tests, and the measurement of various physical properties and the evaluation of resistance to acids and corrosion were performed with respect the prepared specimens.

Example 6

The respective predetermined amounts of the polyamide resin (component A2), the syndiotactic polystyrene resin (component B1), the modified polyphenylene ether resin (component B2), and the glass fibers comprising glass 1 containing no boron oxide (component C1) shown in Table 1 were melt-kneaded using a twin-screw kneader TEX44HCT to prepare pellets of a desired polyamide resin composition.

Then, the obtained pellets were subjected to injection molding under conditions such that the temperature of the molten resin was 290° C., the mold temperature was 80° C., the average injection speed in the mold was 250 mm/sec, and the pressure was maintained at 60 MPa×20 sec to prepare specimens for the respective tests, and the measurement of various physical properties and the evaluation of resistance to acids and corrosion were performed with respect the prepared specimens.

Example 7

A test was performed under substantially the same conditions as in Example 6 except that the predetermined amount of the polyamide resin (component A3) shown in Table 1 was used.

Example 8

A test was performed under substantially the same conditions as in Example 5 except that the glass fibers (component C2) shown in Table 1 were used.

Example 9

A test was performed under substantially the same conditions as in Example 5 except that the glass fibers (component C3) shown in Table 1 were used.

Examples 10 to 13

The respective predetermined amounts of the polyamide resin (component A2), the syndiotactic polystyrene resin (component B1), the modified polyphenylene ether resin (component B2), and the glass fibers (component C2) shown in Table 1 were melt-kneaded using a twin-screw kneader TEX44HCT to prepare pellets of a desired polyamide resin composition.

Then, the obtained pellets were subjected to injection molding under conditions such that the temperature of the molten resin was 290° C., the mold temperature was 80° C., the average injection speed in the mold was 250 mm/see, and the pressure was maintained at 60 MPa×20 sec to prepare specimens for the respective tests, and the measurement of various physical properties and the evaluation of resistance to acids and corrosion were performed with respect the prepared specimens.

Comparative Example 1

A test was performed under substantially the same conditions as in Example 1 except that the polyamide resin (component A2) and the glass fibers (component C2) shown in Table 1 were melt-kneaded using a twin-screw kneader TEX44HCT to prepare pellets of a desired polyamide resin composition.

Comparative Example 2

A test was performed under substantially the same conditions as in Example 1 except that the polyamide resin (component A2) and the glass fibers (component C3) shown in Table 1 were melt-kneaded using a twin-screw kneader TEX44HCT to prepare pellets of a desired polyamide resin composition.

TABLE 1

| | | | Example 1 | Example 2 | Example 3 | Example 4 | Example 5 | Example 6 | Example 7 | Comparative Example 1 |
|---|---|---|---|---|---|---|---|---|---|---|
| Component A | A1 | Polyamide 92 | | | | | 70.0 | | | |
| | A2 | Polyamide 6 | 70.0 | | 70.0 | | | 50.0 | | 70.0 |
| | A3 | Polyamide 66 | | 70.0 | | 70.0 | | | 50.0 | |
| Component B | B1 | SPS | | | | | | 15.0 | 15.0 | |
| | B2 | m-PPE | | | | | | 5.0 | 5.0 | |
| Component C | C1 | Glass 1 containing no boron oxide | 30.0 | 30.0 | | | 30.0 | 30.0 | 30.0 | |
| | | Glass 2 containing no boron oxide | | | 30.0 | 30.0 | | | | |
| | C2 | E-glass (CS3J-454) | | | | | | | | 30.0 |
| | C3 | E-glass (ECS03T-289H) | | | | | | | | |
| A/B | wt %/wt % | | 100/0 | 100/0 | 100/0 | 100/0 | 100/0 | 71.4/28.6 | 71.4/28.6 | 100/0 |
| A + B | wt % | | 70 | 70 | 70 | 70 | 70 | 70 | 70 | 70 |
| Acid resistance (Tensile strength maintaining ratio) | % | Treatment condition-A | 103 | 102 | 102 | 103 | 101 | 102 | 103 | 98 |
| | | Treatment condition-B | 103 | 104 | 102 | 104 | 103 | 100 | 102 | 95 |
| | | Treatment condition-C | 105 | 103 | 105 | 101 | 101 | 102 | 101 | 92 |
| Surface appearance | | Treatment condition-A | ○ | ○ | ○ | ○ | ○ | ○ | ○ | Δ |
| | | Treatment condition-D | ○ | ○ | ○ | ○ | ○ | ○ | ○ | x |
| | | Treatment condition-E | ○ | ○ | ○ | ○ | ○ | ○ | ○ | x |
| | | Treatment condition-B | ○ | ○ | ○ | ○ | ○ | ○ | ○ | x |
| | | Treatment condition-C | ○ | ○ | ○ | ○ | ○ | ○ | ○ | x |
| Tensile strength | MPa | ISO527-1.2 | 185 | 190 | 186 | 191 | 175 | 175 | 180 | 190 |
| Modulus in tension | MPa | (Rate of testing: 5 mm/min) | 10200 | 10300 | 10300 | 10400 | 8900 | 10900 | 10800 | 10300 |
| Tensile strain | % | | 3.5 | 3.5 | 3.5 | 3.5 | 3.5 | 2.5 | 2.5 | 3.5 |
| Flexural strength | MPa | ISO178 | 275 | 290 | 283 | 288 | 255 | 250 | 255 | 280 |
| Modulus in flexure | MPa | (Rate of testing: 2 mm/min) | 8800 | 9500 | 8900 | 9200 | 7900 | 9300 | 9400 | 8900 |
| Charpy impact strength | KJ/m$^2$ | Notched 4J | 12.5 | 13.0 | 12.0 | 12.8 | 10.5 | 10.5 | 11.0 | 13.5 |

| | | | Example 8 | Example 9 | Comparative Example 2 | Example 10 | Example 11 | Example 12 | Example 13 |
|---|---|---|---|---|---|---|---|---|---|
| Component A | A1 | Polyamide 92 | 70.0 | 70.0 | | | | | |
| | A2 | Polyamide 6 | | | 70.0 | 50.0 | 50.0 | 45.0 | 40.0 |
| | A3 | Polyamide 66 | | | | | | | |
| Component B | B1 | SPS | | | | 5.0 | 15.0 | 20.0 | 25.0 |
| | B2 | m-PPE | | | | 15.0 | 5.0 | 5.0 | 5.0 |
| Component C | C1 | Glass 1 containing no boron oxide | | | | | | | |
| | | Glass 2 containing no boron oxide | | | | | | | |
| | C2 | E-glass (CS3J-454) | 30.0 | | | 30.0 | 30.0 | 30.0 | 30.0 |
| | C3 | E-glass (ECS03T-289H) | | 30.0 | 30.0 | | | | |
| A/B | wt %/wt % | | 100/0 | 100/0 | 100/0 | 71.4/28.6 | 71.4/28.6 | 64.3/35.7 | 57.1/42.9 |
| A + B | wt % | | 70 | 70 | 70 | 70 | 70 | 70 | 70 |
| Acid resistance (Tensile strength maintaining ratio) | % | Treatment condition-A | 104 | 103 | 97 | 104 | 102 | 103 | 105 |
| | | Treatment condition-B | 103 | 101 | 95 | 100 | 99 | 100 | 103 |
| | | Treatment condition-C | 105 | 99 | 94 | 99 | 98 | 103 | 105 |
| Surface appearance | | Treatment condition-A | ○ | ○ | Δ | ○ | ○ | ○ | ○ |
| | | Treatment condition-D | ○ | ○ | x | Δ | Δ | ○ | ○ |
| | | Treatment condition-E | ○ | ○ | x | Δ | Δ | Δ | ○ |
| | | Treatment condition-B | ○ | ○ | x | x | x | Δ | ○ |
| | | Treatment condition-C | ○ | ○ | x | x | x | x | Δ |
| Tensile strength | MPa | ISO527-1.2 | 180 | 180 | 195 | 175 | 190 | 180 | 170 |
| Modulus in tension | MPa | (Rate of testing: 5 mm/min) | 9200 | 9100 | 10400 | 11500 | 11300 | 11400 | 11600 |
| Tensile strain | % | | 4.0 | 3.5 | 3.0 | 2.5 | 3.0 | 2.5 | 2.0 |
| Flexural strength | MPa | ISO178 | 260 | 260 | 280 | 240 | 280 | 265 | 230 |
| Modulus in flexure | MPa | (Rate of testing: 2 mm/min) | 8200 | 8000 | 8850 | 9800 | 9300 | 9600 | 9900 |
| Charpy impact strength | KJ/m$^2$ | Notched 4J | 12.0 | 11.0 | 13.0 | 12.0 | 13.5 | 12.0 | 10.0 |

As is apparent from Table 1, the polyamide resin composition of the present invention has excellent acid resistance while exhibiting excellent mechanical properties, and further is lightweight and, hence, can be advantageously used in applications of a part for exhaust gas passing therethrough by EGR, such as an intake manifold, an EGR delivery pipe, or an EGR cooler part.

The invention claimed is:

1. A polyamide resin composition comprising:
   component A, which is at least one resin selected from the group consisting of polyamide 6 and polyamide 6, 6 and
   component C, glass, wherein the component C consists of component C1, glass containing no boron oxide,
   the amount of the component A and the amount of the component C being, respectively, 40 to 95% by weight and 60 to 5% by weight, based on 100% by weight of the polyamide resin composition
   wherein said polyamide resin composition does not comprise either a styrene polymer or a modified polyphenylene ether.

2. A molded article comprising the polyamide resin composition according to claim 1, said molded article being in the form of a part of an exhaust gas recirculation (EGR) system through which exhaust gas passes.

3. A part of an exhaust gas recirculation system through which exhaust gas passes, the part comprising the molded article according to claim 2, said part being selected from the group consisting of an intake manifold, an EGR delivery pipe, an EGR pipe, an EGR valve and an EGR cooler part.

4. The part according to claim 3, which is part of an automobile.

5. The part according to claim 3, which is part of an engine room.

6. A method for producing a part of an exhaust gas recirculation (EGR) system through which exhaust gas passes, the method comprising shaping the polyamide resin composition according to claim 1 into a part selected from the group consisting of an intake manifold, an EGR delivery pipe, an EGR pipe, an EGR valve and an EGR cooler part.

7. A method for producing an automobile, comprising incorporating a part of an exhaust gas recirculation (EGR) system through which exhaust gas passes, which is obtained by the method according to claim 6.

* * * * *